(No Model.) 3 Sheets—Sheet 1.
W. A. LORENZ.
COMPARTMENT PAPER BAG.
No. 471,257. Patented Mar. 22, 1892.
Fig 1.
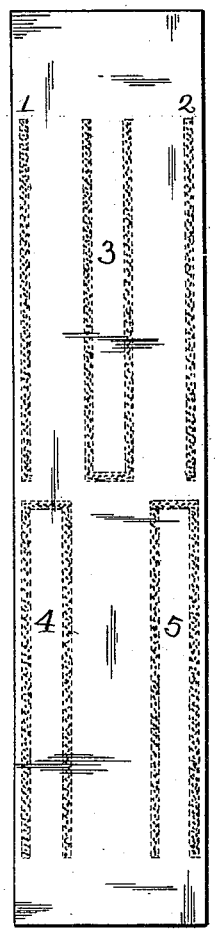
Fig 2.
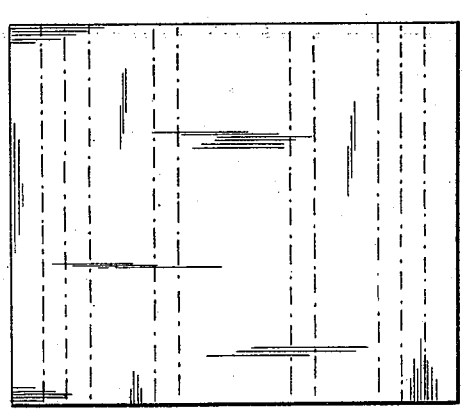
Fig 5.
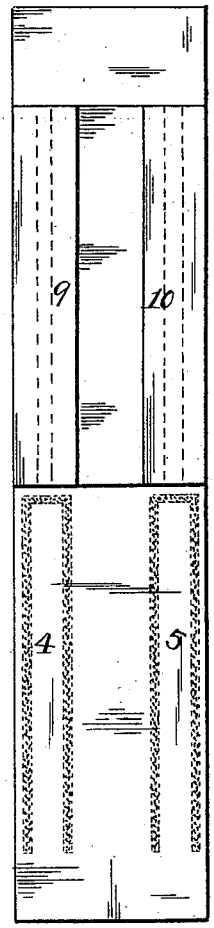
Fig 3.
Fig 4.
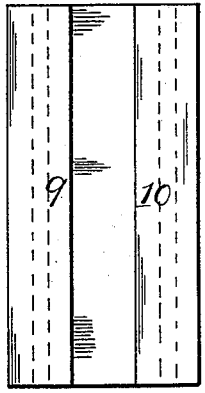
Witnesses:
P. A. Phelps.
Ed. E. Claussen.
Inventor:
William A. Lorenz (No Model.) 3 Sheets—Sheet 2.
W. A. LORENZ.
COMPARTMENT PAPER BAG.
No. 471,257. Patented Mar. 22, 1892.
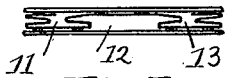
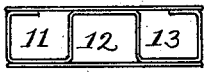
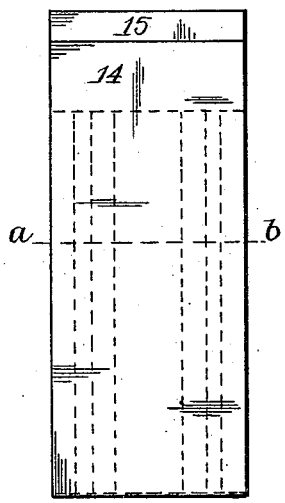
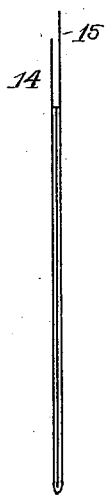
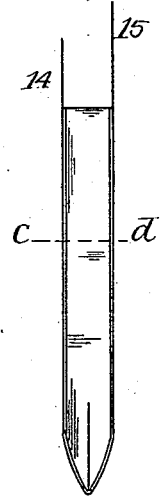
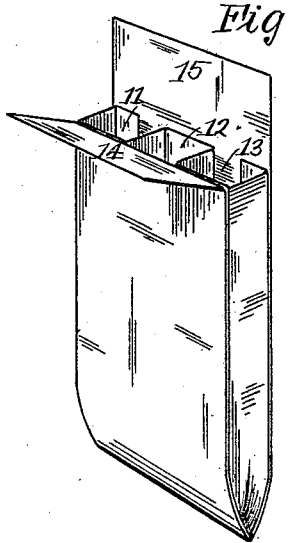
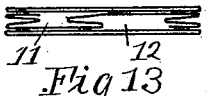
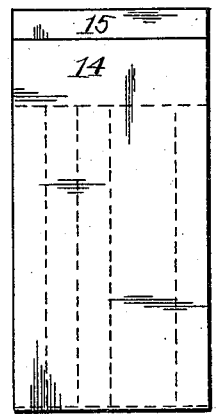
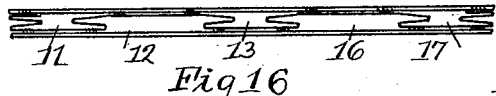
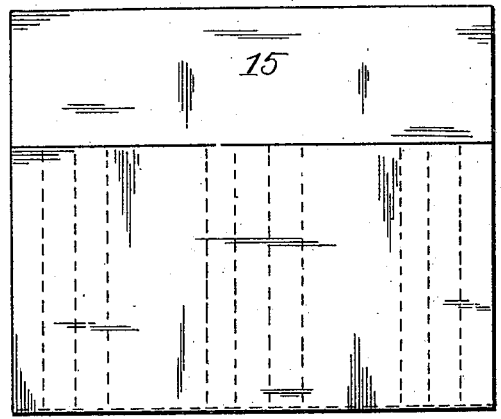
Witnesses:
P. A. Phelps
Ed. E. Claussen
Inventor:
William A. Lorenz (No Model.) 3 Sheets—Sheet 3.
W. A. LORENZ.
COMPARTMENT PAPER BAG.
No. 471,257. Patented Mar. 22, 1892.
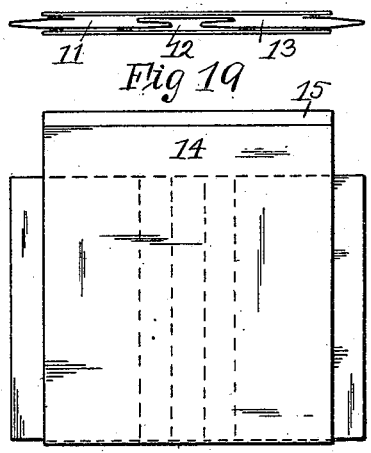
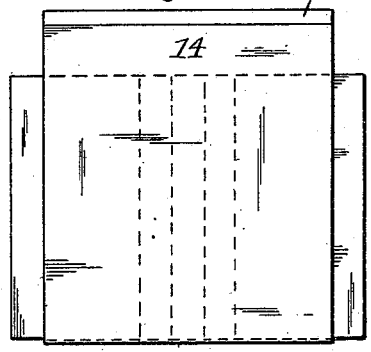
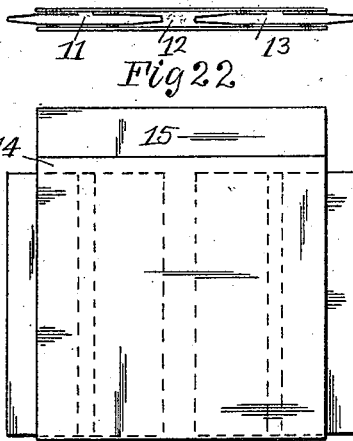
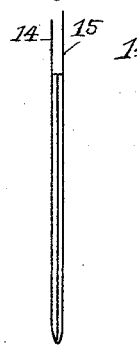
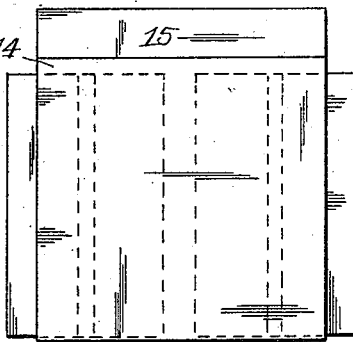
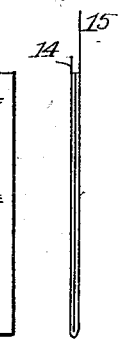
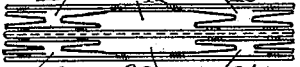
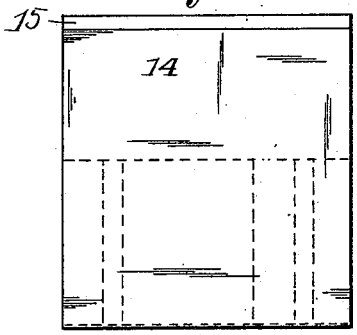
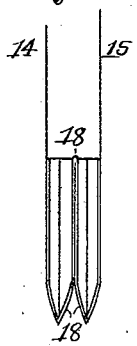
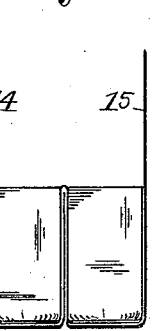
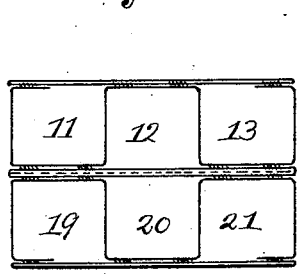
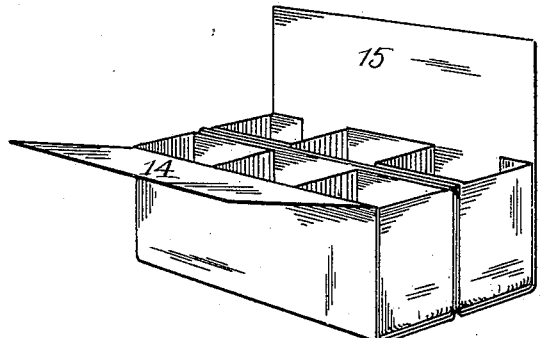
Witnesses:
P. A. Phelps.
Ed. E. Claussen
Inventor:
William A. Lorenz

UNITED STATES PATENT OFFICE.

WILLIAM A. LORENZ, OF HARTFORD, CONNECTICUT, ASSIGNOR OF ONE-HALF TO WILLIAM H. HONISS, OF SAME PLACE.

COMPARTMENT PAPER BAG.

SPECIFICATION forming part of Letters Patent No. 471,257, dated March 22, 1892.

Application filed May 6, 1891. Serial No. 391,759. (No model.)

*To all whom it may concern:*

Be it known that I, WILLIAM A. LORENZ, of Hartford, Connecticut, have invented a new and useful Collapsed Compartment Bag, of which the following description and claims constitute the specification, and which is illustrated by the accompanying three sheets of drawings.

This invention is a collapsed compartment bag consisting of two main rectangular walls united at one edge and of two plicated side walls respectively uniting another edge of each of the main walls and of one or more plicated partitions pasted to the insides of the main walls and dividing the bag into plicated compartments.

Figure 1 of the drawings is a view of a rectangular piece of paper suitable to be folded midway of its length into the outer walls of the bag and provided with the single paste-lines 1 and 2 and the double paste-lines 3, 4, and 5. Fig. 2 is a view of a rectangular piece of paper suitable to be folded and pasted between the outer walls of the bag, so as, together with them, to constitute a complete bag. Figs. 3 and 4 are an end view and a side view, respectively, of the sheet of Fig. 2, folded on the dot-and-dash lines thereof. Fig. 5 is a view of the blank of Figs. 3 and 4, pressed down upon the blank of Fig. 1, with its surfaces 6 and 7 adhering to the single paste-lines 1 and 2, respectively, and with its surface 8 adhering to the double paste-line 3. Figs. 6, 7, and 8 are a cross-section, a side view, and an edge view, respectively, of the blank of Fig. 5, with the lower part thereof folded over upon the upper part, so that the double paste-lines 4 and 5 adhere to the surfaces 9 and 10 of what was the blank of Figs. 3 and 4, Fig. 6 being a section on the line *a b* of Fig. 7. The bag thus completed has the plicated compartments 11, 12, and 13 and the flaps 14 and 15 extending upward from the mouths of those compartments. Fig. 9 is an edge view of the bag of Figs. 6, 7, and 8, with its plicated compartments 11, 12, and 13 expanded into rectangular forms. Fig. 10 is a cross-section on the line *c d* of Fig. 9. Fig. 11 is a perspective view of the bag of Figs. 9 and 10, looking into the mouths of the compartments 11, 12, and 13 between the flaps 14 and 15. Figs. 12 and 13 are an end and a side view, respectively, of a bag identical with the bag of Figs. 6, 7, and 8, except that it lacks the compartment 13 and except that the outer plicated wall of its compartment 12 is folded inward instead of outward. Fig. 14 is a view of the right-hand edge of the bag of Figs. 12 and 13 when its compartments are expanded into rectangular forms. Figs. 15 and 16 are an end and a side view, respectively, of a bag identical with that of Figs. 6, 7, and 8, except that it has two additional compartments 16 and 17, which are duplicates of the compartments 12 and 13, respectively, of the bag of Figs. 6, 7, and 8, and except that it has no flap 14. Fig. 17 is a view of the right-hand edge of the bag of Figs. 15 and 16 when its compartments are expanded into rectangular forms with flat bottoms. Figs. 18, 19, and 20 are an end view, a side view, and an edge view, respectively, of a bag identical with that of Figs. 6, 7, and 8, except that the plicated walls of the compartments 11 and 13 are folded outwardly instead of inwardly, while the plicated walls of the compartment 12 are folded inwardly instead of outwardly. Figs. 21, 22, and 23 are an end, a side, and an edge view, respectively, of a bag identical with the bag of Figs. 18, 19, and 20, except that the folded paper pasted between the outer walls is in two pieces instead of in one, and except that the flap 14 is shorter than it is in the bag of Figs. 18, 19, and 20. Figs. 24 and 25 are an end and a side view, respectively, of a bag like that of Figs. 6, 7, and 8, except that it has pasted between its outer walls two blanks, like that of Figs. 3 and 4, which two blanks are separated from each other by an upward-extending and downward-returning fold 18, pasted between them, so that the bag has the duplicate plicated compartments 19, 20, and 21, as well as the plicated compartments 11, 12, and 13 of the bag of Figs. 6 and 7. Fig. 26 is a view of the right-hand edge of the bag of Figs. 24 and 25 when its compartments are partly expanded. Figs. 27, 28, and 29 are an end view, a horizontal view, and a perspective view, respectively, of the bag of Figs. 24, 25, and 26 when all its compartments are opened out into rectangular forms with flat bottoms. Thus the bag of Figs. 24 to 29, inclusive, substantially consists of two of the bags of Figs. 6 to 11, inclusive, pasted side by side together.

This paper bag in either of its forms may be made by cutting, folding, and pasting paper in the ways indicated in the drawings and explained in the foregoing description; but it may be much more rapidly and cheaply made by machinery which I have invented or am inventing.

In using paper bags like either of the forms shown in the drawings for the reception of cigars, and particularly where the cigars have bands of paper wrapped around them midway of their lengths, the cigars ought first to be thrust into those compartments the plicated walls of which are folded outward from the centers thereof, because the plicated walls of those compartments cannot catch the paper bands on the cigars and thus interfere with their easy entrance into the compartments, and because the filling of those compartments with cigars operates to expand them not only, but also operates to expand the compartments at their sides, which originally had inwardly-inclined longitudinal folds. When the latter compartments are thus expanded by the filling of their neighbors, they themselves can readily be filled, because their inwardly-inclined folds are now opened out into substantially flat walls. This alternation of the two forms of compartments in each series, though not an indispensable feature of this kind of paper bag, is a decidedly desirable one.

The flaps 14 and 15 are conveniently made of unequal lengths to facilitate the opening of a collapsed bag, and after the bag is filled they are folded and may be pasted down upon the mouths of the compartments, so as to cover the contents thereof; but one of these flaps may be omitted and the mouths of the compartments be entirely covered by the other flap, or both flaps may be omitted and the mouths of the compartments be left uncovered, or be covered by a separate piece of paper, if desired.

I claim as my invention—

1. A collapsed compartment bag consisting of two main walls united at one edge of each and of two plicated side walls respectively uniting another edge of each of the main walls and of one or more plicated partitions fastened to the insides of the main walls and dividing the bag into plicated compartments, the plications in the side walls and partitions enabling the bag to be expanded and the compartments thus opened by simply pulling or pushing the main walls apart, all substantially as described.

2. A collapsed compartment bag consisting of two main walls united at one edge of each and of two plicated side walls respectively uniting another edge of each of the main walls and of one or more plicated partitions fastened to the insides of the main walls and dividing the bag into plicated compartments, the plications in the side walls and partitions enabling the bag to be expanded and the compartments thus opened by simply pulling or pushing the main walls apart, and one or more of the compartments having its side walls folded outward from the longitudinal center of such compartment or compartments, all substantially as described.

WILLIAM A. LORENZ.

Witnesses:
ALBERT H. WALKER,
P. A. PHELPS.